United States Patent
Song et al.

(10) Patent No.: US 9,255,234 B2
(45) Date of Patent: Feb. 9, 2016

(54) DEVICE AND METHOD FOR MANUFACTURING NATURAL GAS HYDRATE

(75) Inventors: Myung Ho Song, Seoul (KR); Yong Seok Yoon, Seoul (KR); Hye Jung Hong, Seoul (KR); Jung Huyk Ahn, Goyang-si (KR); Mun Keun Ha, Geoje-si (KR); Seok Ku Jeon, Seoul (KR); Hoon Ahn, Seoul (KR); Ta Kwan Woo, Busan (KR)

(73) Assignees: Dongguk University Industry-Academic Cooperation Foundation, Seoul (KR); Sung-Il Turbine Co., Ltd., Busan (KR); Samsung Heavy Ind. Co., Ltd., Seoul (KR); Daewoo Engineering & Construction Co., Ltd., Seoul (KR); Hyundai Engineering Co., Ltd., Seoul (KR)

( * ) Notice: Subject to any disclaimer, the term of this patent is extended or adjusted under 35 U.S.C. 154(b) by 304 days.

(21) Appl. No.: 13/818,477
(22) PCT Filed: Aug. 23, 2010
(86) PCT No.: PCT/KR2010/005598
§ 371 (c)(1), (2), (4) Date: Feb. 22, 2013
(87) PCT Pub. No.: WO2012/026631
PCT Pub. Date: Mar. 1, 2012

(65) Prior Publication Data
US 2013/0158306 A1 Jun. 20, 2013

(51) Int. Cl.
*B01J 19/18* (2006.01)
*C10L 3/10* (2006.01)
(Continued)

(52) U.S. Cl.
CPC .... *C10L 5/12* (2013.01); *B01J 3/04* (2013.01); *B01J 19/18* (2013.01); *C10L 3/107* (2013.01);
(Continued)

(58) Field of Classification Search
None
See application file for complete search history.

(56) References Cited

U.S. PATENT DOCUMENTS 6,028,234 A 2/2000 Heinemann et al.
6,653,516 B1 * 11/2003 Yoshikawa et al. ............. 585/15

FOREIGN PATENT DOCUMENTS

JP 2001072615 A 3/2001
JP 2003321685 A * 11/2003
(Continued)

OTHER PUBLICATIONS
Derwent abstract (2005-730958) of JP-2005-298745, Oct. 2005 (3 pages).*
(Continued)

*Primary Examiner* — Jennifer A Leung
(74) *Attorney, Agent, or Firm* — Locke Lord LLP; James E. Armstrong, IV; Howard M. Gitten

(57) ABSTRACT

Disclosed are a device and a method for manufacturing a natural gas hydrate. Provided is the device for manufacturing a natural gas hydrate comprising: an ice slurry generation unit for preparing ice slurry having 13-20% of ice at normal pressure; a first pipe, having one end connected to the ice slurry generation unit for withdrawing the ice slurry from the ice slurry generation unit, and in which a high-pressure pump for increasing pressure on the ice slurry is interposed; a hydrate preparation reactor, which is connected to the other end of the first pipe so as to receive the pressurized ice slurry, and to which natural gas is supplied and mixed, for generating natural gas hydrate slurry; a second pipe, having one end connected to the hydrate preparation reactor, for withdrawing the natural gas hydrate slurry; and a dehydrating portion, which is connected to the other end of the second pipe, for dehydrating the natural gas hydrate slurry.

9 Claims, 2 Drawing Sheets

(51) Int. Cl.
*C10L 5/12* (2006.01)
*B01J 3/04* (2006.01)

(52) U.S. Cl.
CPC ............ *C10L 3/108* (2013.01); *B01J 2219/002* (2013.01); *B01J 2219/00063* (2013.01); *B01J 2219/00065* (2013.01); *B01J 2219/00162* (2013.01); *B01J 2219/00164* (2013.01); *B01J 2219/00213* (2013.01); *B01J 2219/00236* (2013.01); *B01J 2219/182* (2013.01)

(56) References Cited

FOREIGN PATENT DOCUMENTS

| | | | |
|---|---|---|---|
| JP | 2004075771 | A | 3/2004 |
| JP | 2005-298745 | * | 10/2005 |
| JP | 2005298745 | A | 10/2005 |
| JP | 2006176709 | A | 7/2006 |
| JP | 2007238850 | A | 9/2007 |
| JP | 2007269874 | A | 10/2007 |
| KR | 20040107767 | A | 12/2004 |

OTHER PUBLICATIONS

Machine translation for JP 2005-298745 A (Oct. 2005).*
Machine translation for JP 2003-321685 A (Nov. 2003).*
Office Action dated Jun. 3, 2014 in JP Application No. 2013-525793.
Japanese Office Action of JP Appln. No. 2013-525793 dated Jan. 21, 2014.
International Search Report of PCT/KR2010/005598.

* cited by examiner

DEVICE AND METHOD FOR MANUFACTURING NATURAL GAS HYDRATE

CROSS-REFERENCE TO RELATED APPLICATIONS

This application is the national phase under 35 U.S.C. §371 of PCT International Application No. PCT/KR2010/005598, filed Aug. 23, 2010, the entire contents of the aforementioned application is hereby incorporated herein by reference.

TECHNICAL FIELD

The present invention relates to a device for manufacturing natural gas hydrate and a method for manufacturing natural gas hydrate.

BACKGROUND ART

Natural gas is a clean fossil fuel of which the demand has skyrocketed globally and the resource development has been fiercely competed because it generates significantly smaller quantities of carbon dioxide per fuel mass during the combustion than coal and petroleum. Natural gas that is produced from gas fields is used as fuel through transportation and storage processes after removing mostly sulfur, carbon dioxide, water and polymer hydrocarbon but methane.

Since the price of natural gas is mostly dependent upon the facility and operation costs of implementing the above processes in addition to the margin and interest, the most economical transportation and storage method is selected, considering various factors such as the size of the gas field and the distance to the consumer. The most typical marine transportation method is the LNG (liquefied natural gas) method, and the compressibility of LNG is about 600 when it is normal condition methane.

Nonetheless, the economic feasibility of the LNG method is restricted due to the cryogenic requirement of LNG, and thus the LNG method is applicable for gas fields with a certain scale or more (i.e., currently at least about 3 trillions of cubic feet).

In order for methane, which is the main component of natural gas, to exist stably as a liquid under normal pressure, the temperature needs to be −162 degrees Celsius or lower. Accordingly, metal materials used in the LNG facility that is exposed to cryogenic conditions need to include high concentrations of expensive nickel so as to minimize the brittleness. Moreover, due to a great difference in temperature between the inside and the outside during the transportation and storage processes, heat influx causes a large amount of BOG (boil off gas) to be generated.

In order to achieve economic feasibility of developing relatively small scale gas fields by overcoming these shortcomings and saving production costs of natural gas, GTS (gas to solid) technologies have been widely studied to transport/ store natural gas using solid gas hydrate as storage medium. Particularly, in 1990, a Norwegian professor, named Prof Gudmundsson, presented the self-preservation effect theory of hydrate to motivate many industrialized nations, such as Japan, to develop key technologies required for realizing commercial GTS methods.

Natural gas hydrate (NGH), which is crystal mixture in which natural gas molecules are collected within solid state lattices of hydrogen-bonding water molecules, has an external shape that is similar to ice and maintains its solid state stably if a pressure that is higher than a certain value is applied at a given temperature. In order for methane hydrate to stably exist thermodynamically under normal pressure, the temperatures needs to be −80 degrees Celsius or lower, but the self-preservation effect of delaying the decomposition of hydrate for several weeks is discovered when ice film is formed on the surface of a hydrate particle at temperatures of about −20 degrees Celsius.

The gas compressibility of NGH is about 170 (that is, about 170 cc of normal condition natural gas is stored in Ice of hydrate), which is disadvantageous than LNG, but the temperature condition for transportation and storage of NGH is more advantageous. Accordingly, it has been theoretically verified that the GTS method using NGH is an economically alternative option of the LNG method for small-to-medium scale gas fields.

The elemental technologies constituting the GTS method include the NGHP (natural gas hydrate pellet) production technology, which transforms natural gas to the pellet type of hydrate before transporting/storing natural gas, and the revaporizing technology, which recovers natural gas by decomposing the NGH afterwards.

Recently, KR Patent Number 100720270 discloses a method for producing natural gas hydrate by spraying high-pressure methane gas and ice water into a reactor, and a number of other Korean and foreign patents suggest methods for manufacturing gas hydrate.

The conventional methods used for manufacture of gas hydrate commonly cools a reactor from an outside or include an internal heat exchange device in order to remove heat of formation of the hydrate, and thus have shortcomings when it is desired to expand the size of the reactor in order to manufacture a large quantity of gas hydrate in high speed for commercialization. In other words, the heat exchange area of the cooler or the heat exchange device can be limitedly expanded in proportion to the volume of the reactor, and thus it takes a long time to remove the heat of formation of the natural gas hydrate, making it difficult to mass-manufacture natural gas hydrate.

DISCLOSURE

Technical Problem

The present invention can provide a device for manufacturing natural gas hydrate and a method for manufacturing natural gas hydrate that can manufacture a large quantity of natural gas hydrate continuously by using latent heat of ice slurry, instead of a heat exchange device, to remove heat of formation occurred when natural gas hydrate is generated.

Technical Solution

An aspect of the present invention features a device for manufacturing natural gas hydrate, which includes: an ice slurry generation unit configured to prepare ice slurry having 13-20% of ice at normal pressure; a first pipe having one end thereof connected to the ice slurry generation unit so as to allow the ice slurry to be discharged from the ice slurry generation unit and having a high-pressure pump interposed therein for increasing pressure on the ice slurry; a hydrate preparation reactor connected to the other end of the first pipe and configured to generate natural gas hydrate slurry by having the pressurized ice slurry flowed thereinto and natural gas supplied thereto and mixed with each other; a second pipe having one end thereof connected to the hydrate preparation reactor so as to allow the natural gas hydrate slurry to be discharged; and a dehydrating portion connected to the other end of the second pipe and configured to dehydrate the natural gas hydrate slurry.

The high-pressure pump can pressurize the ice slurry to 50-70 bar. The hydrate preparation reactor can include: a pipe having one end thereof connected to the first pipe and being horizontally disposed; and an agitator installed inside and along the pipe.

The device for manufacturing natural gas can also include a pressure sensor configured to measure a pressure inside the pipe, and the pressure inside the pipe can be measured by the pressure sensor, and the natural gas can be supplied in such a way that the pressure inside the pipe is constant.

The device for manufacturing natural gas can also include a temperature sensor placed at the other end of the pipe and configured to measure a temperature of the natural gas hydrate slurry, and an amount of the natural gas hydrate slurry discharged through the second pipe can be controlled according to the temperature measured by the temperature sensor.

The amount of the discharged natural gas hydrate slurry can be increased if the temperature measured by the temperature sensor is 4 degrees Celsius or higher, and the amount of the discharged natural gas hydrate slurry can be decreased if the temperature measured by the temperature sensor is 2 degrees Celsius or lower.

The agitator can include an impeller or a rotor screw. The natural gas hydrate slurry generated by the hydrate preparation reactor can have 10-15% of hydrate.

The dehydrating portion can separate the natural gas hydrate slurry into powder and water having 90% of hydrate.

The water separated by the dehydrating portion can be returned to the ice slurry generation unit.

Another aspect of the present invention can feature a method for manufacturing natural gas hydrate by: forming ice slurry having 13-20% ice at normal pressure and storing the ice slurry in an ice slurry generation unit; pressurizing the ice slurry discharged from the ice slurry generation unit with a high-pressure pump and injecting the pressurized ice slurry into a hydrate preparation reactor through a first pipe, and injecting natural gas into the hydrate preparation reactor; generating natural gas hydrate slurry by mixing the ice slurry and the natural gas in the hydrate preparation reactor; supplying the natural gas hydrate slurry prepared by the hydrate preparation reactor to a dehydrating portion through a second pipe; and separating the natural gas hydrate slurry into natural gas hydrate powder and water in the dehydrating portion.

The high-pressure pump can pressurize the ice slurry to 50-70 bar.

The hydrate preparation reactor can include: a pipe having one end thereof connected to the first pipe and being horizontally disposed; and an agitator installed inside and along the pipe, and the natural gas hydrate slurry can be prepared as the ice slurry and the natural gas pass through the pipe.

The hydrate preparation reactor can also include a pressure sensor configured to measure a pressure inside the pipe, and the pressure inside the pipe can be measured by the pressure sensor, and the natural gas can be supplied in such a way that the pressure inside the pipe is constant.

The hydrate preparation reactor can also include a temperature sensor placed at the other end of the pipe and configured to measure a temperature of the natural gas hydrate slurry, and an amount of the natural gas hydrate slurry discharged through the second pipe can be controlled according to the temperature measured by the temperature sensor.

The amount of the discharged natural gas hydrate slurry can be increased if the temperature measured by the temperature sensor is 4 degrees Celsius or higher, and the amount of the discharged natural gas hydrate slurry can be decreased if the temperature measured by the temperature sensor is 2 degrees Celsius or lower.

The natural gas hydrate slurry generated by the hydrate preparation reactor can have 10-15% of hydrate.

The dehydrating portion can separate the natural gas hydrate slurry into powder and water having 90% of hydrate.

The water separated by the dehydrating portion can be returned to the ice slurry generation an it.

MODE FOR INVENTION

Figure 1:
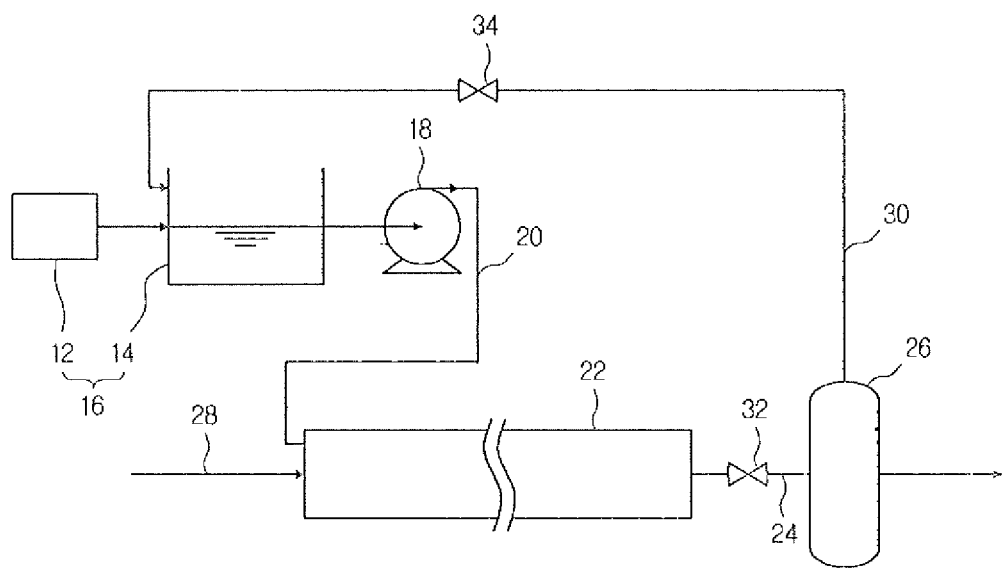
FIG. 1 shows the configuration of a device for manufacturing natural gas hydrate in accordance with an embodiment of the present invention.

Since there can be a variety of permutations and embodiments of the present invention, a certain embodiment will be illustrated and described with reference to the accompanying drawings. This, however, is by no means to restrict the present invention to a certain embodiment, and shall be construed as including all permutations, equivalents and substitutes covered by the ideas and scope of the present invention. Throughout the description of the present invention, when describing a certain relevant conventional technology is determined to evade the point of the present invention, the pertinent detailed description will be omitted.

Hereinafter, a device for manufacturing natural gas hydrate and a method for manufacturing natural gas hydrate in accordance with the present invention will be described in detail with reference to the accompanying drawings. Identical or corresponding elements will be given the same reference numerals, regardless of the figure number, and any redundant description of the identical or corresponding elements will not be repeated.

Figure 2:
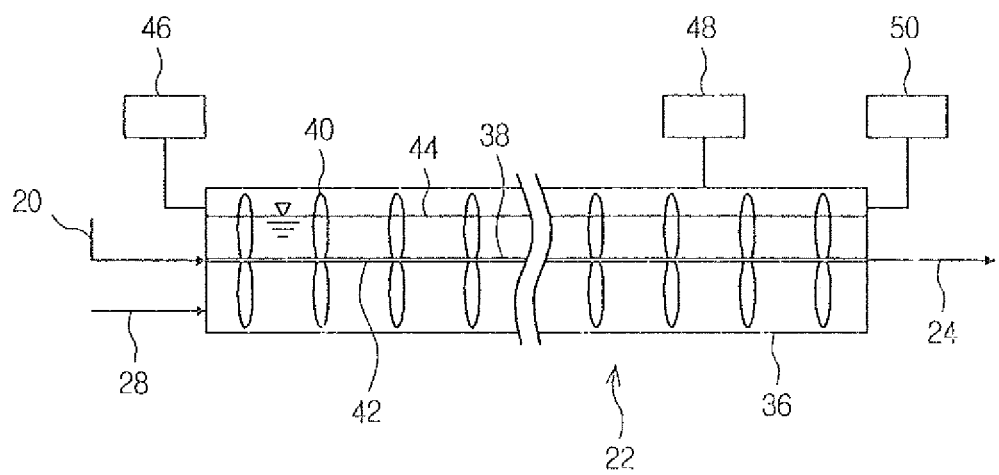
FIG. 2 shows a hydrate preparation reactor of the device for manufacturing natural gas hydrate in accordance with an embodiment of the present invention.
Figure 3:
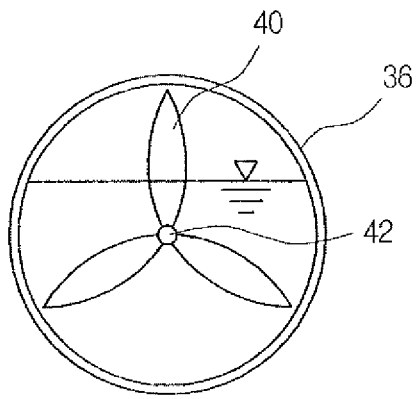
FIG. 3 is a cross-sectional view of the hydrate preparation reactor of the device for manufacturing natural gas hydrate in accordance with an embodiment of the present invention.

FIG. 1 shows the configuration of a device for manufacturing natural gas hydrate in accordance with an embodiment of the present invention, and FIG. 2 shows a hydrate preparation reactor of the device for manufacturing natural gas hydrate in accordance with an embodiment of the present invention, and FIG. 3 is a cross-sectional view of the hydrate preparation reactor of the device for manufacturing natural gas hydrate in accordance with an embodiment of the present invention. Illustrated in FIGS. 1 to 3 are a raw water tank 12, an ice slurry generator 14, an ice slurry generation unit 16, a high-pressure pump 18, a first pipe 20, a hydrate preparation reactor 22, a second pipe 24, a dehydrating portion 26, a gas supply line 28, a raw water recovering line 30, a valve 32, a back pressure regulator 34, a pipe 36, an agitator 38, an impeller 40, a rotation axis 42, a water level 44, a pressure sensor 46, a temperature sensor 48 and a water level sensor 50.

The device for manufacturing natural gas hydrate in accordance with the present embodiment includes: an ice slurry generation unit 16 for preparing ice slurry having 13-20% of ice at normal pressure; a first pipe 20, having one end connected to the ice slurry generation unit 16 for withdrawing the ice slurry from the ice slurry generation unit 16, and in which a high-pressure pump 18 for increasing pressure on the ice slurry is interposed; a hydrate preparation reactor 22, which is connected to the other end of the first pipe 20 so as to receive the pressurized ice slurry, and to which natural gas is supplied and mixed, for generating natural gas hydrate slurry; a second pipe 24, having one end connected to the hydrate preparation reactor 22, for withdrawing the natural gas hydrate slurry; and a dehydrating portion 26, which is connected to the other end of the second pipe 24, for dehydrating the natural gas hydrate slurry. Accordingly, it becomes possible to manufacture a large quantity of natural gas hydrate continuously by using latent heat of the ice slurry to remove heat of formation occurred when the natural gas hydrate is generated.

In the present embodiment, 90% or more of the natural gas is constituted with methane gas, and the hydrate has methane molecules and water molecules mixed therein, and thus natural gas will be treated as the same as methane gas.

When water of 0 degree Celsius and natural gas have a phase change to natural gas hydrate, the heat of formation occurred is approximately 433 kJ/kg, and the latent heat when ice melts is approximately 335 kJ/kg. Accordingly, in the case that the heat of formation of natural gas hydrate is removed using the latent heat of melting ice, ice slurry having 13-20% of ice can produce natural gas hydrate slurry having 10-15% of natural gas in an adiabatic state.

The device for manufacturing natural gas hydrate in accordance with the present embodiment can produce natural gas hydrate consecutively by using the latent heat of ice slurry having a certain portion of ice that can provide fluidity. Here, producing consecutively does not mean producing a batch type of natural gas hydrate but means consecutively producing natural gas hydrate without interruption, by one operation of the device, Accordingly, the fluidity of ice slurry is very important in order to produce natural gas hydrate consecutively, and the fluidity of ice slurry is affected by the proportion of ice included in the ice slurry.

According to studies conducted by the applicant of the present invention, fluidity is required for consecutively producing natural gas hydrate slurry having a proportion of natural gas hydrate that can provide for both economic feasibility and fluidity, and 13-20% of ice in ice slurry is efficient for producing natural gas hydrate slurry having said proportion of natural gas hydrate. When natural gas hydrated is manufactured using natural gas hydrate slurry, the proportion of natural gas hydrate needs to be at least 10% in order to be economically feasible, and the economic feasibility becomes insufficient when the proportion of natural gas hydrate is lower than 10%. Therefore, in order to manufacture natural gas hydrate slurry having about 10% of natural gas hydrate in accordance with the present embodiment, ice slurry having about 13% of ice and natural gas need to be mixed in the hydrate preparation reactor 22. It shall be appreciated that ice slurry having about 13% of ice has sufficient fluidity.

Meanwhile, studies show that ice slurry having 20% or more of ice has a lower fluidity, and hence a lower mobility in the pipe 20, making it very difficult to be pressurized by the high-pressure pump 18. In the ease that ice slurry having about 20% of ice and natural gas are mixed in the hydrate preparation reactor 22 in accordance with the present embodiment, natural gas hydrate slurry having about 15% of natural gas hydrate can be formed.

The proportion of ice means a proportion of ice mass to an entire mass of ice slurry, and the proportion of natural gas hydrate means a proportion of hydrate mass to an entire mass of natural gas hydrate slurry.

The ice slurry generation unit 16 produces ice slurry having 13-20% of ice at normal pressure. It is required that the ice slurry generation unit 16 is able to produce ice slurry at normal pressure in order to facilitate the manufacture and operation of the device for manufacturing natural gas hydrate. The ice slurry generation unit 16 produces ice slurry having 13-20% of ice by allowing raw water above zero degree Celsius to be supplied to the ice slurry generator 14 from the raw water tank 12 in which the raw water is stored. There are various ice slurry generators available in the market, and thus detailed description thereof will be omitted. The first pipe 20 has one end thereof connected to the ice slurry generation unit 16 so as to have ice slurry discharged from the ice slurry generation unit 16, and has the high-pressure pump 18, which increases pressure on the ice slurry, interposed in the middle thereof.

Since the fluidity of ice slurry can be provided by using ice slurry having 13-20% of ice, ice slurry can be readily transferred through the first pipe 20. Owing to the first pipe 20 and the second pipe 24, which will be described later, much freedom can be provided in designing the device for manufacturing natural gas hydrate in accordance with an embodiment of the present invention. That is, instead of adjacently disposing the ice slurry generation unit 16, the hydrate preparation reactor 22 and the dehydrating portion 26 without any pipe, the ice slurry generation unit 16, the hydrate preparation reactor 22 and the dehydrating portion 26 can be installed in various locations through a pipe.

The high-pressure pump 18 interposed in the first pipe 20 increases pressure of ice slurry to a pressure required for manufacturing hydrate in the hydrate preparation reactor 22, which will be described later, and supplies the ice slurry to the hydrate preparation reactor 22 through the first pipe 20. Owing to the fluidity of the ice slurry having 13-20% of ice, the pressure of ice slurry can be readily increased using the high-pressure pump 18 that is placed outside the hydrate preparation reactor 22.

The high-pressure pump 18 can increase the pressure of the ice slurry to 50-70 bar. Since the equilibrium pressure of natural gas hydrate and water at the temperature of 0 degree Celsius, which is the melting point of ice, is approximately 26 bar, additional pressure is needed to obtain a sufficient speed of manufacturing natural gas hydrate, but an excessive increase of pressure significantly increases the manufacturing cost of the hydrate preparation reactor 22. Accordingly, the high-pressure pump 18 can increase the pressure of the ice slurry to 50-70 bar so that super cooling for driving the formation of hydrate is in the range between 6.5 and 9.7 degrees Celsius.

The hydrate preparation reactor 22 is connected to the other end of the first pipe 20 and produces natural gas hydrate as the ice slurry pressurized by the high-pressure pump 18 is flowed thereinto and mixed with natural gas supplied through the gas supply line 28. There is no separate cooling device or heat-exchange device installed in the hydrate preparation reactor 22, and the natural gas hydrate slurry is produced by removing the heat of formation of natural gas hydrate using the latent heat of the ice slurry.

The hydrate preparation reactor 22 can produce natural gas hydrate slurry having 10-15% of natural gas hydrate by allowing natural gas and ice slurry having 13-20% of ice to be mixed therein in an adiabatic state and removing the heat of formation of natural gas hydrate.

The hydrate preparation reactor 22 in accordance with the present embodiment can include the pipe 36, which is horizontally disposed and has one end thereof connected with the first pipe 20, and the agitator 39, which is installed inside and along the pipe 36. The pressurized ice slurry is flowed in at one end of the pipe 36 through the first pipe 20, and natural gas is injected at the one end of the pipe 36 through the gas supply line 28. Then, as the ice slurry is transported and continues to be mixed with natural gas along the pipe 36, natural gas hydrate is gradually produced, and natural gas hydrate slurry having nearly 0% of ice can be produced at the other end of the pipe 36 as ice in the ice slurry is melted. Accordingly, the agitator 38 is installed along the pipe 36 inside the pipe 36 so that the ice slurry and the natural gas can be readily agitated.

Since the pipe 36 is horizontally disposed, the moving speed of the ice slurry can be readily controlled by adjusting the amount of ice slurry supplied to the pipe 36. The length of the pipe 36 can be determined based on the diameter of the pipe 36, the moving speed of the ice slurry and the amount of natural gas hydrate slurry to be produced. In the case that the pipe 36 is long, the pipe 36 can be arranged in a zig-zag form to reduce an installation space.

The agitator 38 can include the impeller 40 or a rotor screw. The rotation axis 42 is installed along a central axis of the pipe 36, and the impeller 40, in the form of a clapper or a pinwheel, or the rotor screw is installed on the rotation axis 42. Accordingly, as the impeller 40 or the rotor screw is rotated by the rotation of the rotation axis 42, the ice slurry and the natural gas can be agitated, and the ice slurry can be transported to the other end of the pipe 36.

The pipe 36 of the hydrate preparation reactor 22 can have the pressure sensor 46 installed therein for measuring a pressure inside the pipe 36, and by measuring the pressure through the pressure sensor 46, the natural gas can be supplied so as to keep a constant pressure inside the pipe 36.

By using the water level sensor 50 to measure the water level 44 of the ice slurry flowed into the pipe 36 through the first pipe 20, the ice slurry can be supplied in such a way that a constant space is maintained above the water level 44 of the ice slurry inside the horizontally-disposed pipe 36.

Moreover, the pipe 36 of the hydrate preparation reactor 22 can also include the temperature sensor 48 placed at the other end thereof for measuring a temperature of the natural gas hydrate slurry. The amount of the natural gas hydrate slurry discharged to the second pipe 24 can be controlled based on the temperature measured through the temperature sensor 48. For example, in the case that the pressure inside the hydrate preparation reactor 22 is 50 bar, the amount of discharged natural gas hydrate slurry can be increased if the temperature measured by the temperature sensor 48 is higher than 4 degrees Celsius, and can be decreased if the temperature is lower than 2 degrees Celsius.

The range of temperatures for determining the increase or decrease of the amount of discharged natural gas hydrate slurry can be a section in which temperature change occurs relatively rapidly while the temperature of a medium of the natural gas hydrate slurry rises from 0 degree Celsius, which is the melting point of ice, to 6.5 degrees Celsius, which is the equilibrium temperature, after the ice is used up as the natural gas hydrate slurry is gradually produced while the ice slurry is transported.

The second pipe 24 has one end thereof connected with the hydrate preparation reactor 22 so as to discharge the natural gas hydrate slurry. As described above, the natural gas hydrate slurry has 10-15% of natural gas hydrate, which can provide a sufficient fluidity, due to 13-20% of ice in the ice slurry, and thus the natural gas hydrate slurry can be readily moved through the second pipe 24, making it possible to provide much freedom in designing the device for manufacturing natural gas hydrate in accordance with the present embodiment. The second pipe 24 has the valve 32 interposed therein to control the discharged amount of natural gas hydrate slurry produced by the hydrate preparation reactor 22.

The dehydrating portion 26 is connected to the other end of the second pipe 24 to dehydrate the natural gas hydrate slurry. Since the natural gas hydrate slurry contains a large amount of water, the water is separated through the dehydrating portion 26 to generate natural gas hydrate powder, which can be later manufactured as a pellet type of natural gas hydrate. To manufacture the natural gas hydrate powder in the pellet type, the dehydrating portion 26 can separate the natural gas hydrate slurry into powder and water having 90% of natural gas hydrate and 10% of water. The water separated by the dehydrating portion 26 can be returned to the ice slurry generation unit 16 through the raw water recovering line 30 for use in manufacture of ice slurry. The raw water recovering line 30 has the back pressure regulator 34 interposed therein for maintaining a pressure of the dehydrating portion 26.

As described above, the device for manufacturing natural gas hydrate in accordance with the present embodiment can produce natural gas hydrate slurry continuously by producing the ice slurry at normal pressure and then supplying the ice slurry to the hydrate preparation reactor 22 continuously by use of the high-pressure pump 18 and removing the heat of formation occurred during the generation of the natural gas hydrate by use of the latent heat of ice.

Figure 4:
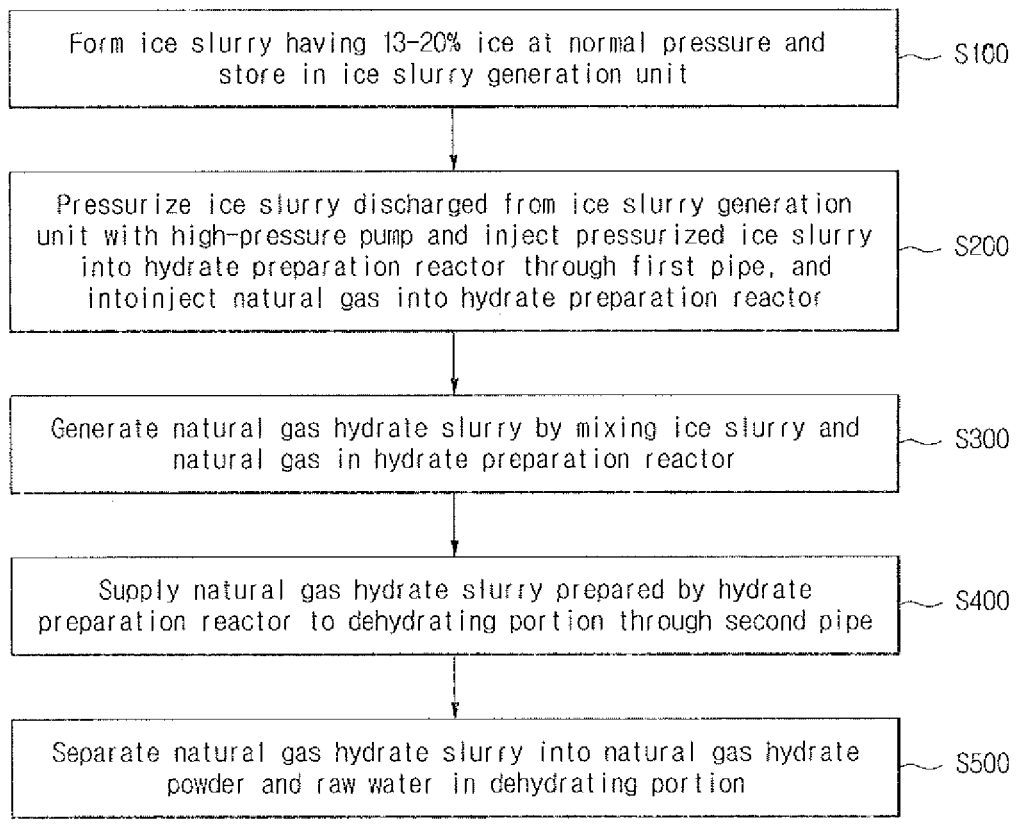
FIG. 4 is a flow diagram of a method for manufacturing natural gas hydrate in accordance with an embodiment of the present invention.

FIG. 4 is a flow diagram of a method for manufacturing natural gas hydrate in accordance with an embodiment of the present invention. Hereinafter, the method for manufacturing natural gas hydrate will be described with reference to FIGS. 1 to 4.

With the method for manufacturing natural gas hydrate in accordance with the present embodiment, a large amount of natural gas hydrate can be manufactured continuously by removing the heat of formation occurred during the generation of the natural gas hydrate by use of the latent heat of ice, by: forming ice slurry having 13-20% of ice at normal pressure and storing the ice slurry in the ice slurry generation unit 16; pressurizing the ice slurry discharged from the ice slurry generation unit 16 with the high-pressure pump 18, injecting the ice slurry into the hydrate preparation reactor 22 through the first pipe 20 and injecting natural gas into the hydrate manufacturing rector 22; mixing the ice slurry and the natural gas in the hydrate preparation reactor 22 and generating natural gas hydrate slurry; supplying the natural gas hydrate slurry generated by the hydrate preparation reactor 22 to the dehydrating portion 26 through the second pipe 24; and separating the natural gas hydrate slurry into natural gas hydrate powder and raw water in the dehydrating portion 26.

First, ice slurry having 13-20% of ice is formed at normal pressure and is stored in the ice slurry generation unit 16 (S100). As described above, the ice slurry needs to have fluidity in order to continuously produce natural gas hydrate slurry having a certain proportion of natural gas hydrate, and the ice slurry having 13-20% of ice is produced due to the requirement of fluidity and economic feasibility. The ice slurry generation unit 16 needs to be able to produce ice slurry at normal pressure. The ice slurry generation unit 16 can supply raw water of above 0 degree Celsius from the raw water tank 12 to the ice slurry generator 14 to generate ice slurry having 13-20% of ice. The ice slurry generator 14 can be manufactured using known art.

Then, the ice slurry discharged from the ice slurry generation unit 16 is pressurized by the high-pressure pump 18 and injected into the hydrate preparation reactor 22 through the first pipe 20, and natural gas is injected into the hydrate preparation reactor 22 (S200). The high-pressure pump 18 interposed in the first pipe 20 pressurizes the ice slurry with a pressure required for the hydrate preparation reactor 22 to prepare hydrate and supplies the pressurized ice slurry to the hydrate preparation reactor 22 through the first pipe 20. Since the fluidity of ice slurry is provided by using the ice slurry having 13-20% of ice, the ice slurry can be readily transported through the first pipe 20. Moreover, owing to the fluidity of ice slurry, the ice slurry can be readily pressurized using the high-pressure pump 18 located outside the hydrate preparation reactor 22. The high-pressure pump 18 can pressurized the ice slurry to 50-70 bar.

As the ice slurry pressurized by the high-pressure pump 18 is flowed into the hydrate preparation reactor 22 through the first pipe 20, the natural gas is supplied at the same time.

Then, natural gas hydrate slurry is produced by mixing the ice slurry and the natural gas in the hydrate preparation reactor 22 (S300). Once the ice slurry pressurized by the high-pressure pump 18 and the natural gas are flowed into the hydrate preparation reactor 22, natural gas hydrate slurry is produced as the ice slurry and the natural gas are mixed with each other. Since the heat of formation of natural gas hydrate is removed using the latent heat of the ice slurry, no cooling apparatus or heat exchange device needs to be separately installed in the hydrate preparation reactor 22. The hydrate preparation reactor 22 can produce natural gas hydrate slurry having 10-15% of natural gas hydrate by allowing natural gas and ice slurry having 13-20% of ice to be mixed therein in an adiabatic state and removing the heat of formation of natural gas hydrate.

The hydrate preparation reactor 22 used for the method for manufacturing natural gas hydrate in accordance with the present embodiment can include the pipe 36, which is horizontally disposed and has one end thereof connected with the first pipe 20, and the agitator 39, which is installed inside and along the pipe 36. Since the pipe 36 and the agitator 38 have been described above, the description thereof will be omitted.

The pipe 36 of the hydrate preparation reactor 22 can have the pressure sensor 46 installed therein for measuring a pressure inside the pipe 36, and by measuring the pressure through the pressure sensor 46, the natural gas can be supplied so as to keep a constant pressure inside the pipe 36. As to the amount of the ice slurry flowed into the pipe 36 through the first pipe 20, the ice slurry is supplied in such a way that a constant space is maintained above a surface of the ice slurry inside the horizontally-disposed pipe 36.

The pipe 36 of the hydrate preparation reactor 22 can also include the temperature sensor 48 placed at the other end thereof for measuring a temperature of the natural gas hydrate slurry. The amount of the natural gas hydrate slurry discharged to the second pipe 24 can be controlled based on the temperature measured through the temperature sensor 48. For example, in the case that the pressure of the hydrate preparation reactor 22 is 50 bar, the amount of discharged natural gas hydrate slurry can be increased if the temperature measured by the temperature sensor 48 is higher than 4 degrees Celsius, and can be decreased if the temperature is lower than 2 degrees Celsius.

Then, the natural gas hydrate slurry prepared by the hydrate preparation reactor 22 is supplied to the dehydrating portion 26 through the second pipe 24 (S400). Since the natural gas hydrate slurry prepared by the hydrate preparation reactor 22 has 10-15% of natural gas hydrate, which is sufficient to provide fluidity, owing to the ice slurry having 13-20% of ice, the natural gas hydrate slurry can be readily supplied to the dehydrating portion 26 through the second pipe 24. The second pipe 24 has the valve 32 interposed therein to control the discharged amount of natural gas hydrate slurry produced by the hydrate preparation reactor 22.

Then, the natural gas hydrate slurry is separated into natural gas hydrate powder and water by the dehydrating portion 26 (S500). As natural gas hydrate slurry contains a large amount of water, water is separated by the dehydrating portion 26 to generate natural gas hydrate powder. Such natural gas hydrate powder can be prepared in the pellet form natural gas hydrate. To prepare the natural gas hydrate powder in the pellet form, the dehydrating portion 26 can separate the natural gas hydrate slurry into powder and water having 90% of natural gas hydrate and 10% of water. The water separated by the dehydrating portion 26 can be returned to the ice slurry generation unit 16 for use in manufacture of ice slurry. Although a certain embodiment of the present invention has been described above, it shall be appreciated that there can be a variety of permutations and modifications of the present invention by those who are ordinarily skilled in the art to which the present invention pertains without departing from the technical ideas and scope of the present invention, which shall be defined by the appended claims.

It shall be also appreciated that a large number of other embodiments than the above-described embodiment are included in the claims of the present invention.

What is claimed is:

1. A device for manufacturing natural gas hydrate, comprising:
    a raw water tank configured to store raw water;
    an ice slurry generation unit configured to produce ice slurry in a normal pressure condition out of the raw water which supplied above zero degrees Celsius from the raw water tank, the ice slurry having 13-20% of ice at normal pressure;
    a first pipe having one end thereof connected to the ice slurry generation unit so as to allow the ice slurry to be discharged from the ice slurry generation unit and having a high-pressure pump interposed therein for increasing pressure on the ice slurry;
    a hydrate preparation reactor connected to the other end of the first pipe and configured to generate natural gas hydrate slurry by having the pressurized ice slurry flowed thereinto and natural gas supplied thereto and mixed with each other;
    a second pipe having one end thereof connected to the hydrate preparation reactor so as to allow the natural gas hydrate slurry to be discharged;
    a dehydrating portion connected to the other end of the second pipe and configured to dehydrate the natural gas hydrate slurry;
    a raw water recovering line configured to return the water separated by the dehydrating portion to the ice slurry generation unit for use in manufacture of the ice slurry; and
    a back pressure regulator interposed in the raw water recovering line for maintaining a pressure of the dehydrating portion.

2. The device of claim 1, wherein the high-pressure pump is configured to pressurize the ice slurry to 50-70 bar.

3. The device of claim 1, wherein the hydrate preparation reactor comprises:
    a pipe having one end thereof connected to the first pipe and being horizontally disposed; and
    an agitator installed inside and along the pipe.

4. The device of claim 3, further comprising a pressure sensor configured to measure a pressure inside the pipe,
    wherein the pressure inside the pipe is measured by the pressure sensor, and the natural gas is supplied in such a way that the pressure inside the pipe is constant.

5. The device of claim 3, further comprising a temperature sensor placed at the other end of the pipe and configured to measure a temperature of the natural gas hydrate slurry,
   wherein an amount of the natural gas hydrate slurry discharged through the second pipe is controlled according to the temperature measured by the temperature sensor.

6. The device of claim 5, wherein the amount of the discharged natural gas hydrate slurry is increased if the temperature measured by the temperature sensor is 4 degrees Celsius or higher, and the amount of the discharged natural gas hydrate slurry is decreased if the temperature measured by the temperature sensor is 2 degrees Celsius or lower.

7. The device of claim 3, wherein the agitator comprises an impeller or a rotor screw.

8. The device of claim 1, wherein the natural gas hydrate slurry generated by the hydrate preparation reactor has 10-15% of hydrate.

9. The device of claim 1, wherein the dehydrating portion is configured to separate the natural gas hydrate slurry into powder and water having 90% of hydrate.

* * * * *